US011081815B2

(12) United States Patent
Byrne et al.

(10) Patent No.: US 11,081,815 B2
(45) Date of Patent: Aug. 3, 2021

(54) ELECTRICAL POWER OR DATA DISTRIBUTION SYSTEM

(71) Applicants: Norman R. Byrne, Ada, MI (US); Timothy J. Warwick, Sparta, MI (US); Aaron G. Lautenbach, Rockford, MI (US); Jonathan M. Golub, Rockford, MI (US); Juan Carlos Angulo, Grand Rapids, MI (US)

(72) Inventors: Norman R. Byrne, Ada, MI (US); Timothy J. Warwick, Sparta, MI (US); Aaron G. Lautenbach, Rockford, MI (US); Jonathan M. Golub, Rockford, MI (US); Juan Carlos Angulo, Grand Rapids, MI (US)

( * ) Notice: Subject to any disclaimer, the term of this patent is extended or adjusted under 35 U.S.C. 154(b) by 0 days.

(21) Appl. No.: 16/191,517

(22) Filed: Nov. 15, 2018

(65) Prior Publication Data
US 2019/0148850 A1 May 16, 2019

Related U.S. Application Data

(60) Provisional application No. 62/587,470, filed on Nov. 16, 2017.

(51) Int. Cl.
*H02G 3/08* (2006.01)
*H02G 3/22* (2006.01)
(Continued)

(52) U.S. Cl.
CPC ........... *H01R 9/2491* (2013.01); *G06F 13/38* (2013.01); *H01R 12/613* (2013.01);
(Continued)

(58) Field of Classification Search
None
See application file for complete search history.

(56) References Cited

U.S. PATENT DOCUMENTS 2,963,676 A  12/1960  Sneesby et al.
2,979,576 A   4/1961  Huber
(Continued)

FOREIGN PATENT DOCUMENTS

GB        2229869       10/1990

*Primary Examiner* — Courtney L Smith
(74) *Attorney, Agent, or Firm* — Gardner, Linn, Burkhart & Ondersma LLP

(57) ABSTRACT

An electrical power or electronic data distribution system includes a power supply or electronic data module that receives electrical power or electronic data signals from a source, a flat-conductor strip for routing electrical power or electronic data along a generally planar surface such as a floor, wall, room divider, or ceiling, and a power or data output block. The power supply has a pair of power outfeed conductors, and the flat-conductor strip has a pair of generally planar electrical conductors in spaced arrangement, which are electrically coupled to respective power outfeed conductors. The output block has a pair of power-receiving contacts along a lower surface thereof, and an electrical receptacle at the output block, the receptacle being positioned above the lower surface. The power-receiving contacts electrically engage respective planar electrical conductors and convey electrical power to respective contacts of the electrical receptacle, for powering electrical or electronic devices.

16 Claims, 17 Drawing Sheets

(51) Int. Cl.
  *H01R 9/24* (2006.01)
  *H01R 12/77* (2011.01)
  *G06F 13/38* (2006.01)
  *H01R 12/61* (2011.01)
  *H02G 3/18* (2006.01)

(52) U.S. Cl.
  CPC ............ *H01R 12/771* (2013.01); *H02G 3/08* (2013.01); *H02G 3/185* (2013.01); *H02G 3/22* (2013.01)

(56) References Cited

U.S. PATENT DOCUMENTS

| | | | |
|---|---|---|---|
| 3,187,290 A | 6/1965 | Winders | |
| 3,208,121 A | 9/1965 | Price | |
| 3,715,627 A | 2/1973 | D'Ausilio | |
| 3,773,987 A | 11/1973 | Davis et al. | |
| 4,201,278 A | 5/1980 | Balde | |
| 4,499,341 A | 2/1985 | Boyd | |
| 4,780,094 A | 10/1988 | Batty et al. | |
| 4,864,081 A * | 9/1989 | Bates | H01R 12/67 174/88 R |
| 4,875,871 A | 10/1989 | Booty, Sr. et al. | |
| 5,243,129 A * | 9/1993 | Bates | H02G 3/185 174/484 |
| 5,306,165 A | 4/1994 | Nadeau | |
| 5,804,768 A | 9/1998 | Sexton | |
| RE36,030 E | 1/1999 | Nadeau | |
| 5,899,774 A | 5/1999 | Sexton | |
| 6,107,577 A | 8/2000 | Sexton | |
| 6,248,663 B1 * | 6/2001 | Bixler | H01R 25/003 438/638 |
| 6,276,502 B1 | 8/2001 | Leyba et al. | |
| 6,350,135 B1 * | 2/2002 | Acklin | H01R 4/34 174/494 |
| 6,367,211 B1 | 4/2002 | Weener et al. | |
| 6,388,190 B1 | 5/2002 | Laukhuf et al. | |
| 6,492,594 B1 | 12/2002 | Magyar et al. | |
| 6,566,598 B1 | 5/2003 | Strong | |
| 6,598,366 B2 | 7/2003 | Hsieh et al. | |
| 6,827,592 B2 | 12/2004 | McCoy et al. | |
| 6,844,493 B2 | 1/2005 | Strong | |
| 6,871,812 B1 | 3/2005 | Chang | |
| 7,094,077 B1 * | 8/2006 | Chen | H01R 25/142 439/118 |
| 7,196,273 B2 | 3/2007 | Tanaka et al. | |
| 7,201,589 B2 | 4/2007 | Jong | |
| 7,438,566 B2 | 10/2008 | Chen | |
| 7,679,222 B2 | 3/2010 | Patterson et al. | |
| 7,826,202 B2 | 11/2010 | Johnson et al. | |
| 7,841,878 B2 | 11/2010 | Johnson et al. | |
| RE42,085 E | 2/2011 | Sexton | |
| 7,946,883 B2 | 5/2011 | Hayes et al. | |
| 7,955,106 B1 | 6/2011 | Crow et al. | |
| 8,172,588 B2 | 5/2012 | Johnson et al. | |
| 8,237,051 B2 | 8/2012 | Sexton et al. | |
| 8,616,921 B2 | 12/2013 | Byrne et al. | |
| 9,146,029 B2 | 9/2015 | Nicieja et al. | |
| 9,225,131 B2 | 12/2015 | Ernest et al. | |
| 9,360,196 B2 | 6/2016 | Nicieja et al. | |
| 9,525,233 B2 | 12/2016 | Staeber et al. | |
| 9,595,777 B2 | 3/2017 | Byrne et al. | |
| 9,685,730 B2 | 6/2017 | Jones et al. | |
| 9,885,467 B2 | 2/2018 | Nicieja et al. | |
| 9,960,554 B2 | 5/2018 | Strong | |
| 10,050,424 B2 | 8/2018 | Jones et al. | |
| 2004/0195446 A1 * | 10/2004 | Smallhorn | B64D 11/0015 244/118.5 |
| 2005/0286246 A1 | 12/2005 | Coon et al. | |
| 2011/0031011 A1 * | 2/2011 | Williams | H02G 3/0431 174/481 |
| 2013/0037303 A1 * | 2/2013 | Wang | H01R 13/025 174/117 FF |
| 2014/0027153 A1 | 1/2014 | Harwath | |
| 2016/0043520 A1 * | 2/2016 | Strong | H01R 25/16 439/211 |
| 2016/0079721 A1 * | 3/2016 | Jones | H01R 13/447 439/587 |
| 2018/0248325 A1 | 8/2018 | Strong | |
| 2018/0316167 A1 | 11/2018 | Schneider et al. | |

\* cited by examiner

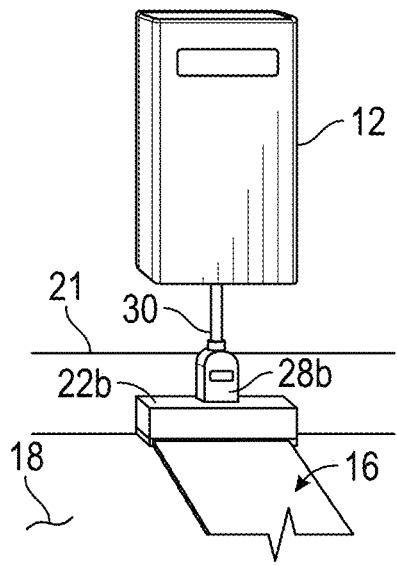
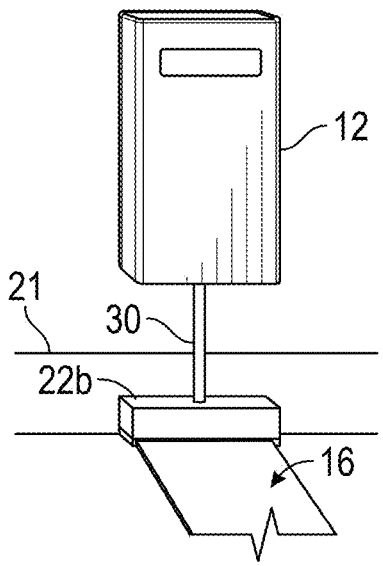
FIG. 2A
FIG. 2B
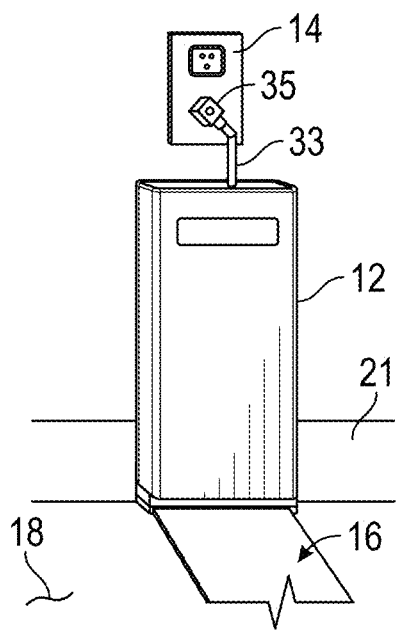
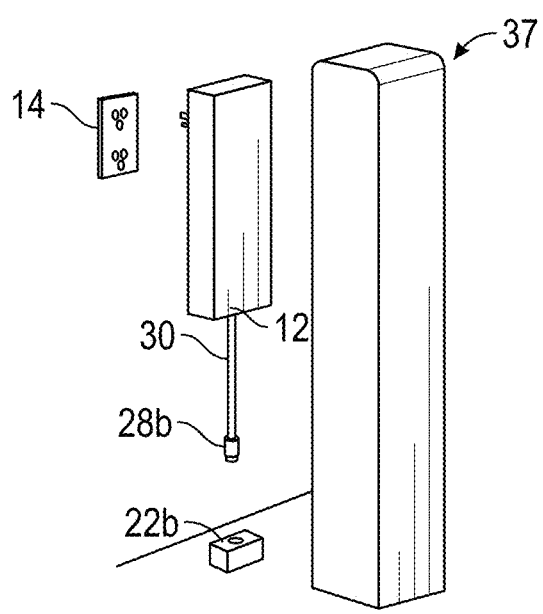
FIG. 2C
FIG. 3

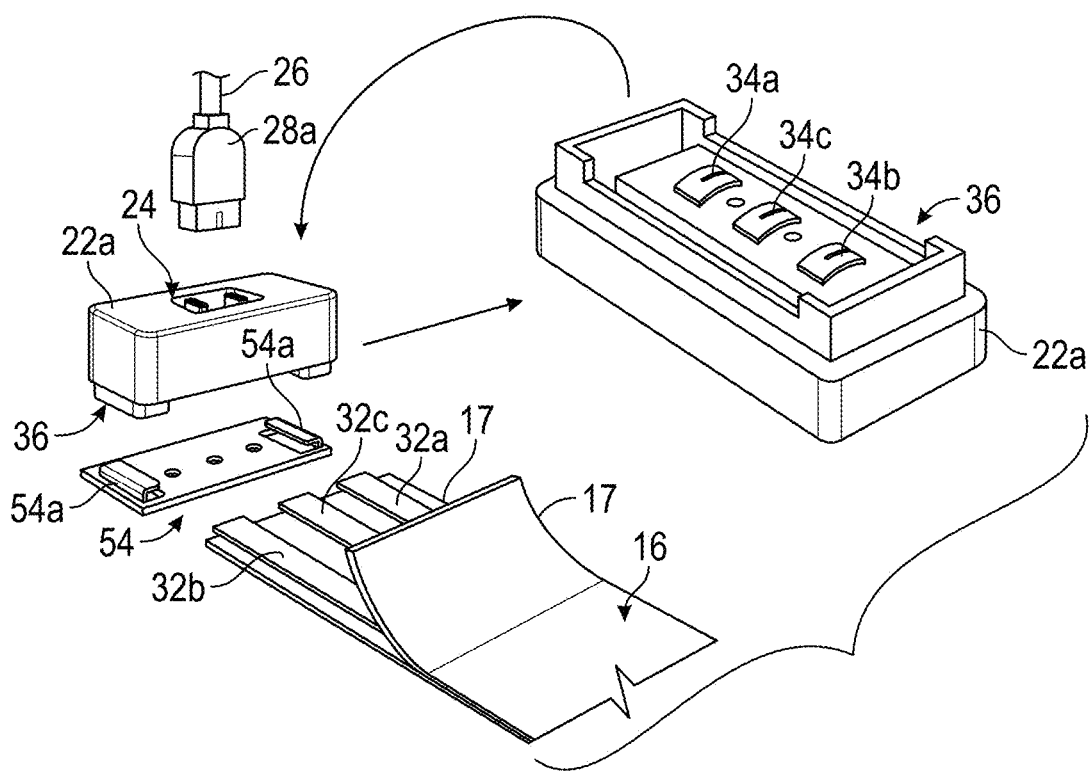
FIG. 12
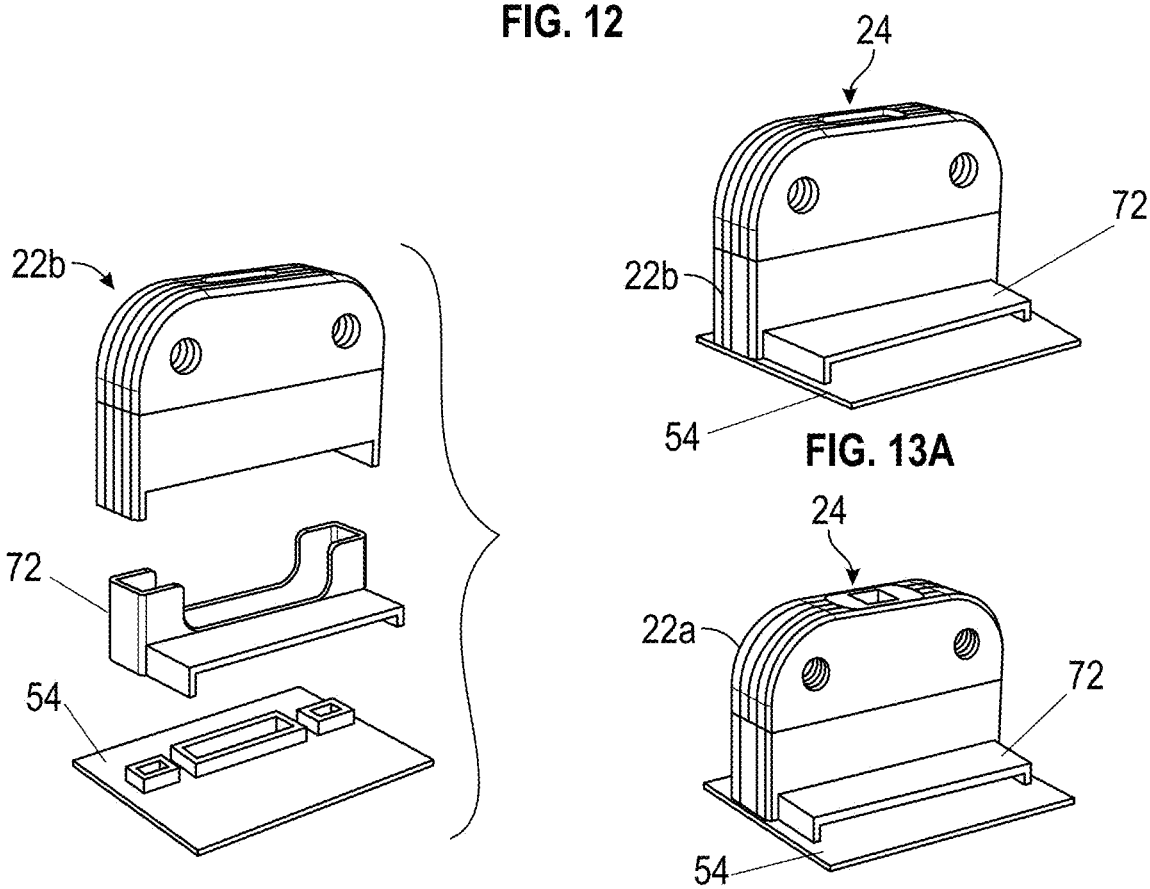
FIG. 13
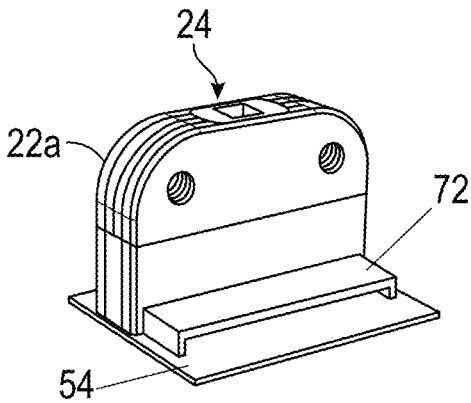
FIG. 13A
FIG. 13B

ELECTRICAL POWER OR DATA DISTRIBUTION SYSTEM

CROSS REFERENCE TO RELATED APPLICATION

The present application claims the benefit of U.S. provisional application Ser. No. 62/587,470, filed Nov. 16, 2017, which is hereby incorporated herein by reference in its entirety.

FIELD OF THE INVENTION

The present invention relates to electrical power distribution systems and, more particularly, to electrical power distribution along flooring, walls, and other surfaces in work areas.

BACKGROUND OF THE INVENTION

In some areas, particularly finished work areas and the like, it is more convenient to route electrical wiring at or along surfaces in a work area as compared to routing wiring through finished walls, ceilings, or even raised floors, especially when the desired location of electrical and/or electronic data outlets is very specific. Although some relatively flat and thin wiring systems have been developed for routing along floor and wall surfaces, for example, these have often been susceptible to damage from heavy objects, susceptible to corrosion, or are labor-intensive to set up, install, or connect to a suitable power supply.

SUMMARY OF THE INVENTION

The present invention provides an extremely low-profile distribution system that can be used to route electrical power below carpet or other finishing materials, to deliver low voltage DC power to areas, such as the middle regions of a large rooms, that are normally difficult to supply with power without use of temporary extension cords, raised floor systems, floor trenches, or the like. The system may be reinforced and structurally designed to resist damage from kicking of exposed outlet blocks, from heavy rolling objects such as carts, and from liquid spills or other environmental contamination. Power outlet blocks may be coupled through carpeting or other floor finishing material, to flat electrical conductors beneath the carpeting or finish, or a portion of the carpet or other finish may be cut away to provide access to the flat conductors. Installation is considerably simpler than many other systems, particularly in rooms or other work areas that are already finished with wall surfaces and flooring finishes.

In one form of the present invention, an electrical power or electronic data distribution system includes a supply module, a conductor strip configured for placement beneath an aesthetic surface such as carpeting or tile or trim, and a receptacle block. The supply module receives electrical power or electronic data from a source, and includes at least two outfeed conductors for supplying power or data signals to respective planar electrical conductors of the conductor strip. The planar conductors are spaced apart and mounted to an insulative sheet. The planar electrical conductors are electrically coupled to respective outfeed conductors. The receptacle block includes a pair of contacts along its lower region, and has at least one electrical receptacle positioned above the lower region and extending outwardly from the aesthetic surface. The contacts are configured to electrically engage respective planar electrical conductors, and to convey electrical power or electronic data signals to respective receptacle contacts of the electrical receptacle.

According to one aspect, a support plate is coupled to the lower region of the receptacle block so that the conductor strip is received and secured between the support plate and the lower region of the receptacle block. Optionally, the contacts are piercing contacts that pierce the insulative sheet material and respective planar electrical conductors when the support plate is coupled to the lower region of the receptacle block.

According to another aspect, the pair of contacts are mounted in a contact support piece that is releasably mechanically and electrical coupled to the lower region of the receptacle block, and the contact support piece is releasably mechanically coupled to the support plate.

According to yet another aspect, the support plate and the receptacle block are arranged along a midsection of the conductor strip with portions of the conductor strip extending in opposite directions away from the receptacle block.

According to a further aspect, a connector is disposed along the conductor strip, and a portion of the insulative sheet material is removed at the connector to expose portions the planar electrical conductors for engagement by the contacts of the receptacle block.

According to still another aspect, the connector is insertable into the lower region of the receptacle block, and the pair of contacts are frictional contacts that engage the exposed portions of the planar electrical conductors.

According to a still further aspect, the connector is generally L-shaped with a base leg and an outwardly-extending leg. At least the outwardly-extending leg is configured to extend through an opening formed in the aesthetic surface, and the exposed portions of the planar electrical conductors are positioned in the outwardly-extending leg.

According to another aspect, a support base is coupled to the base leg of the L-shaped connector, and the support base is configured for placement beneath the aesthetic surface and for attachment to a surface underlying the aesthetic surface.

According to yet another aspect, the base leg of the L-shaped connector is configured to clamp to the conductor strip.

According to a further aspect, the supply module is an AC-to-DC electrical power converter. Optionally, a wall-mounting bracket supports the supply module. The wall-mounting bracket may define an opening for providing access to a wall-mounted power outlet.

According to still another aspect, a table or desk power distribution system is coupled to the electrical power or electronic data distribution system. Optionally, the table or desk power distribution system includes a first jumper wire coupled to the receptacle block, a junction box coupled to the first jumper wire, a second jumper wire coupled to the junction box, and a desk-mountable or table-mountable power outlet coupled to the second jumper wire.

Accordingly, the flat-conductor electrical power or electronic data distribution system of the present invention facilitates the provision of at least low voltage electrical power and/or electronic data at substantially any desired area throughout a work area or the like. The system utilizes a conductor strip that it sufficiently low in profile to be routed underneath carpeting or other aesthetic finishes, and the use of modular connectors and receptacle blocks facilitates rapid installation with little or no modification to structural floor surfaces, wall panels, or the like, and with minimal tool requirements.

These and other objects, advantages, purposes and features of the present invention will become apparent upon review of the following specification in conjunction with the drawings.

BRIEF DESCRIPTION OF THE DRAWINGS

FIGS. 2A-2C are perspective views of wall-mounted electrical power supplies for a flat-conductor power distribution system like that of FIG. 1;

FIG. 3 is a perspective view of a shrouded wall-mounted electrical power supply for a flat-conductor power distribution system like that of FIG. 1;

FIG. 12 is an exploded perspective view of a single-port electrical power outlet and flat conductor, and includes an additional perspective view of the receptacle block in an inverted orientation to show its electrical contacts;

FIG. 13 is an exploded perspective view of another single-port electrical power infeed for connection to a flat conductor;

FIG. 13A is perspective view of the single-port electrical power infeed of FIG. 13;

FIG. 13B is a perspective view of a single-port electrical power outfeed having a similar configuration to the infeed of FIGS. 13 and 13A;

DESCRIPTION OF THE PREFERRED EMBODIMENTS

Figure 1:
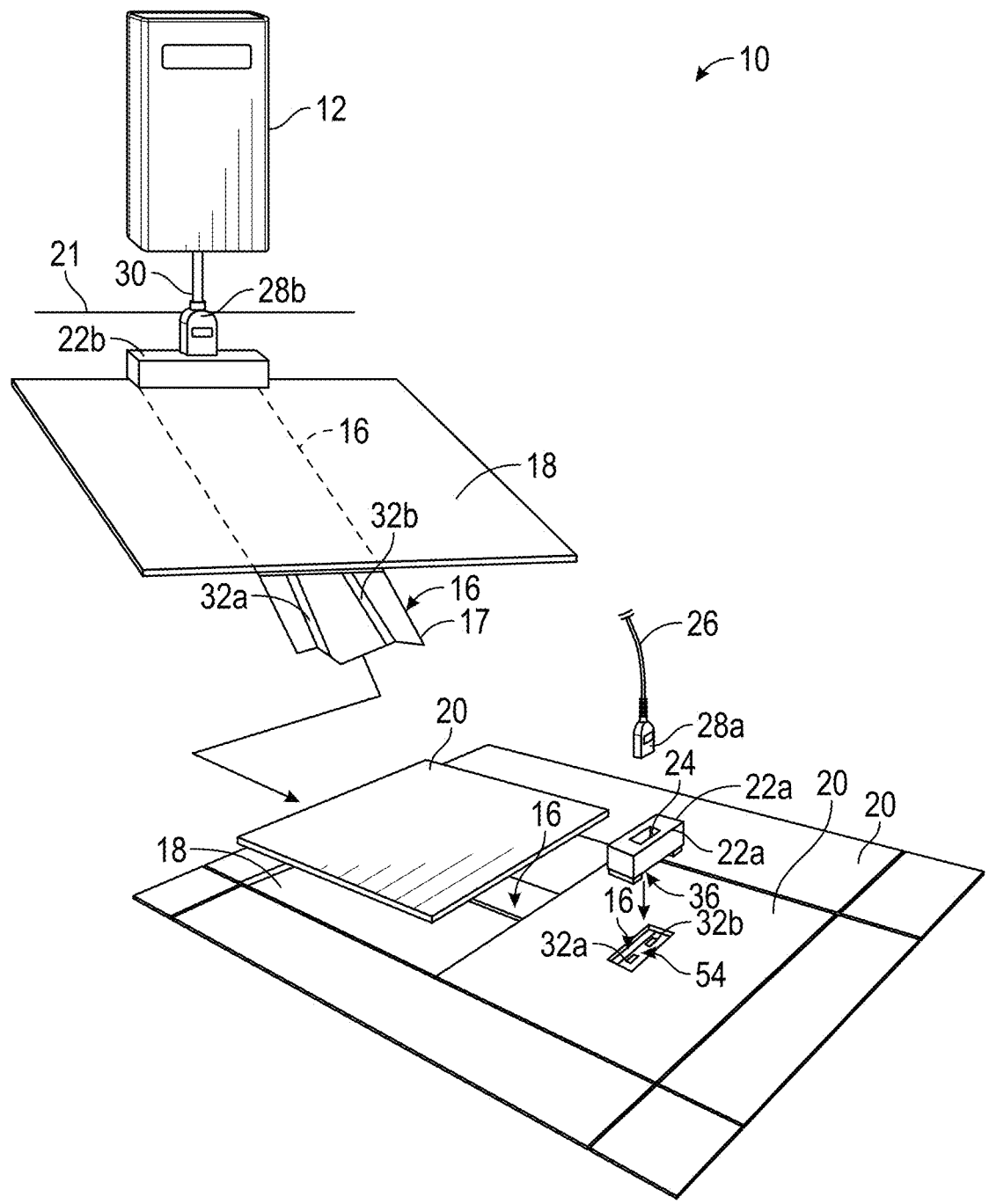
FIG. 1 is a perspective view of a flat-conductor electrical power or data distribution system in accordance with the present invention.
Figure 16:
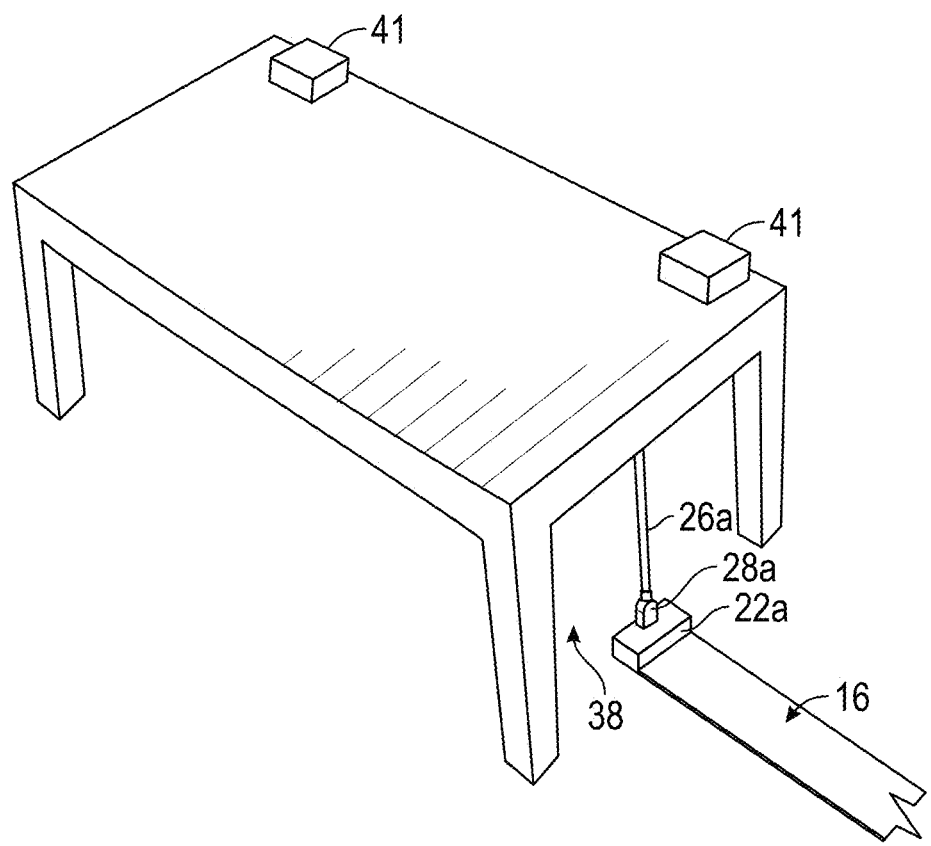
FIG. 16 is a top perspective view of an outfeed end of a flat-conductor electrical power distribution system in accordance with the present invention, shown connected to an electrical system of a table.
Figure 16A:
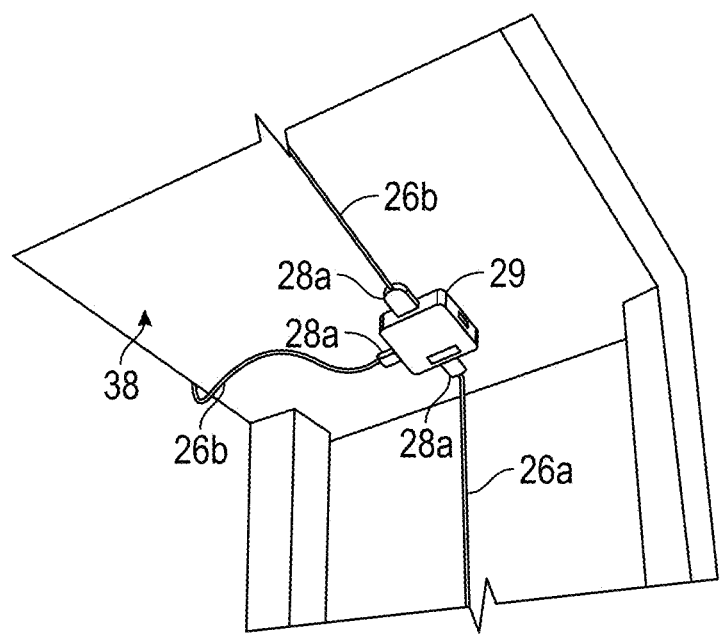
FIG. 16A is a bottom perspective view of a portion of the table and table electrical system of FIG. 16.

Referring now to the drawings and the illustrative embodiments depicted therein, an electrical power or electronic data distribution system 10 includes a power supply module 12 that receives electrical power from a power source 14, such as shown in FIGS. 1-4G. Throughout the description and drawings, it will be appreciated that in many cases functionally similar or functionally related or identical components are given identical reference numerals, although their appearance or shape configurations differ. A flat-conductor strip 16 is provided for routing electrical power or electronic data along a generally planar surface such as a floor 18 or a wall, room divider, or ceiling, for example, and may be routed underneath a carpet tile 20 (FIG. 1) or other flooring surface, behind and aesthetic wall molding 21 (FIGS. 1-2C and 5A-5C), or otherwise obscured below or behind an aesthetic covering. The flat-conductor strip 16 terminates at or passes through a power output receptacle block 22a, where one or more electrical receptacles 24 provide users with access to electrical power and/or electronic data via cords 26 fitted with compatible plugs 28a (FIGS. 6, 16 and 16A). Optionally, and as shown in FIG. 1, a power input receptacle block 22b may be substantially identical to power output receptacle block 22a, for receiving power from power supply module 12 and conveying that power to the flat-conductor strip 16. Differences between the output block 22a and the input block 22b may be limited to a different connector interface for either power infeed or power outfeed.

Figure 14A:
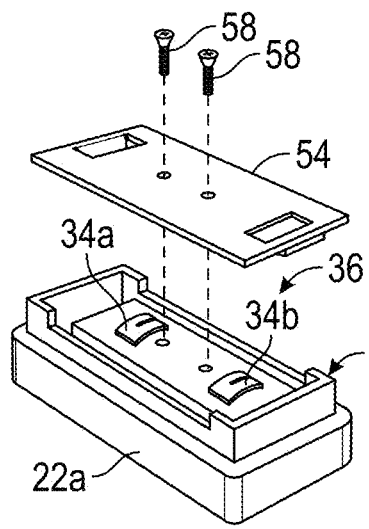
FIGS. 14A-14C are partially exploded perspective views of three receptacle blocks with non-piercing contacts, shown in an inverted orientation, and similar to the receptacle block of FIG. 12.
Figure 14B:
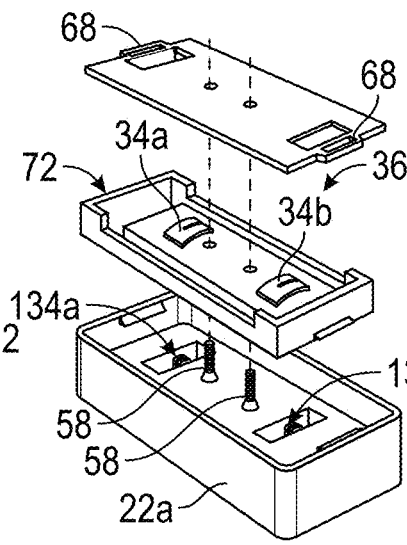

Referring again to FIG. 1, the power supply module 12 has a pair of power outfeed conductors (contained in a jacketed cord 30) that terminate in a plug 28b that is received by the power input receptacle block 22b. The flat-conductor strip 16 includes a pair of generally planar electrical conductors 32a, 32b in spaced arrangement along an insulative film or sheet material or substrate 17, which may be made from two layers of flexible polymeric material, fiber-reinforced sheet material, or the like, which may be secured together, such as by adhesive bonding, with conductors 32a, 32b in between. The power receptacle block 22a has at least two power-receiving contacts 34a, 34b (see, e.g., FIGS. 10A, 11A, 12 and 14A-15) along a lower surface 36 thereof, and at least one electrical receptacle 24 at the power receptacle block 22a, as noted above. Power-receiving contacts 34a, 34b may be configured in any suitable manner, such as frictional contacts (FIGS. 7A-8C and 10A-11B), spring-loaded pressure contacts 34a, 34b (FIGS. 12 and 14A-14C), or piercing contacts 234a, 234b (FIGS. 14D-15). The receptacles 24 are positioned above the lower surface 36, as shown. The power-receiving contacts 34a, 34b electrically engage respective planar electrical conductors 32a, 32b of the flat-conductor strip 16 and convey electrical power to respective contacts of the electrical receptacle(s) 24, for powering electrical or electronic devices. Optionally, additional electrical distribution systems, such as table or desk power systems 38, may be supplied with power from the electrical power distribution system 10, such as shown in FIGS. 6, 16 and 16A. In the illustrated embodiment, the table or desk power system 38 includes a first jumper wire 26a with respective plugs 28a for directing power from the power output receptacle block 22a to a power distribution hub 39 for directing power to additional outlets, and second jumper wires 26b with respective plugs and table-mounted power outlets 41 at opposite end thereof.

Figure 4A:
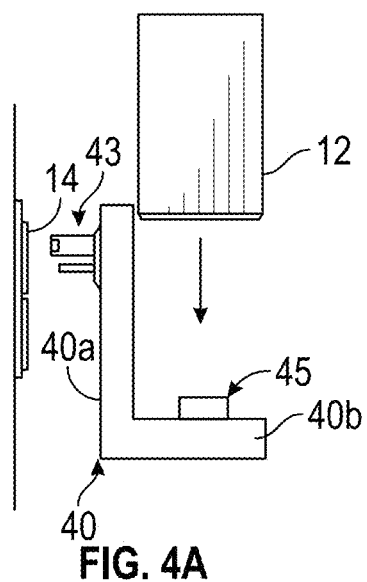
FIGS. 4A-4G are perspective views of wall-supported electrical power supplies for a flat-conductor power distribution system like that of FIG. 1.

In FIGS. 2A-2C there are shown wall-supported power supply modules 12 supported at or near power receptacles 14 (receptacles are not visible in FIGS. 2A and 2C), while in FIG. 2C another module 12 rests along the floor and receives power from the wall outlet 14 via a cord 33 and plug 35. In FIG. 3 power supply module 12 is covered by a shroud 37 that is provided to protect and obscure the electrical components. Optionally, and as shown in FIGS. 4A-4G various wall-mounting brackets 40 and structures may be provided for supporting power supply modules 12 at or near a power source such as a wall outlet 14. In FIG. 4A a generally L-shaped bracket 40 includes a set of rearwardly-facing prongs 43 near an upper end of a vertical leg 40a and configured for engagement with a wall receptacle 14, and an upwardly-facing connector 45 along the horizontal leg 40b, which is engaged by the power supply module 12.

Figure 4B:
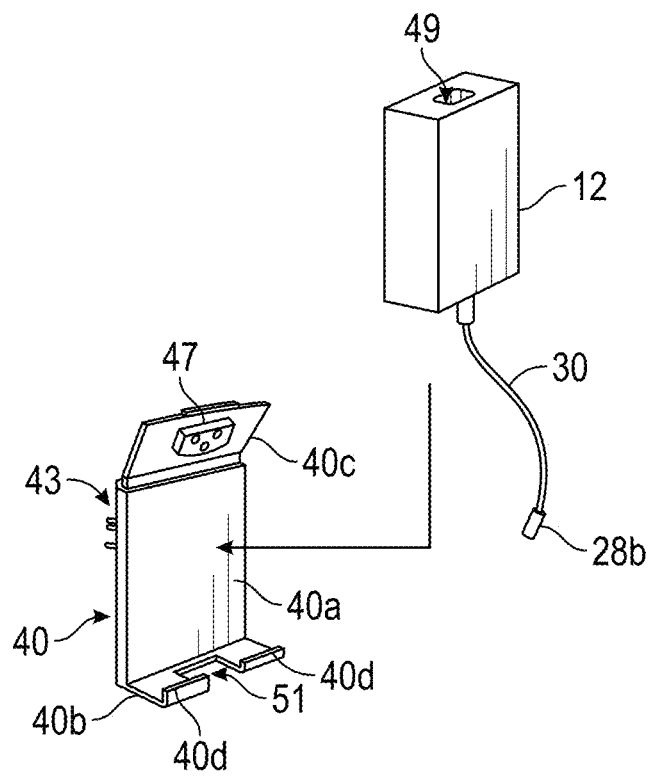

The bracket 40 of FIG. 4B includes a hinged upper panel 40c that extends upwardly and/or forwardly of a vertical leg/panel 40a, the hinged upper panel 40c being fitted with an electrical connector 47 that is configured for engagement with a corresponding connector 49 at an upper end of the power supply module 12. The bracket 40 of FIG. 4B includes a lower horizontal leg 40b with a cut-out notch 51 formed therein, which permits a lower exit for the output cord 30 of the power supply module 12, as shown. When power supply module 12 is positioned at the bracket 40 of FIG. 4B, the power supply module 12 is secured to the bracket 40 by a pair of upwardly-extending edges 40d on either side of the notch 51 at a forward end of the horizontal leg 40b, and by the engagement of connectors 47, 49. In this manner, the power supply module 12 can be initially placed at the bracket 40 with hinged upper panel 40c in a raised or partially raised position, followed by lowering the hinged upper panel 40c so that the electrical connectors engage, thereby securing the power supply module 12 at the bracket 40 (FIG. 4B).

Figure 4C:
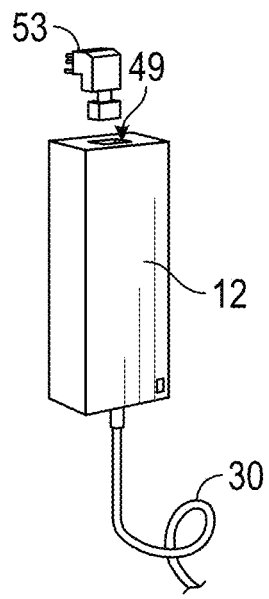
Figure 4D:
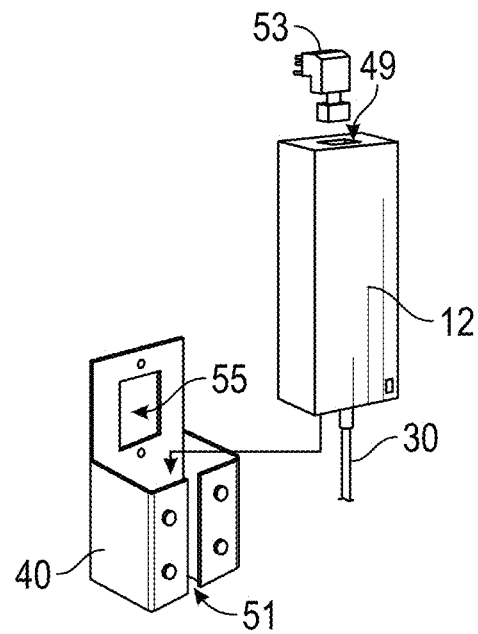

In the arrangement of FIGS. 4C and 4D, power supply module 12 is illustrated with an angled connector piece 53 for connection to a wall outlet. A holster-style bracket 40 (FIG. 4D) supports the power supply module 12 on five sides, and includes a slot 51 for power cord 30, and an opening 55 that provides access for connector piece 53 to the wall outlet. The holster-style bracket 40 can be mounted to the wall outlet with a pair of screws, in a manner that allows the bracket to replace a traditional power outlet cover plate. Optionally, magnets 57 on either side of slot 51 may be used to help secure the power supply module 12 in the bracket 40, such as if an outer housing of the power supply module 12 is made of ferrous material.

Figure 4E:
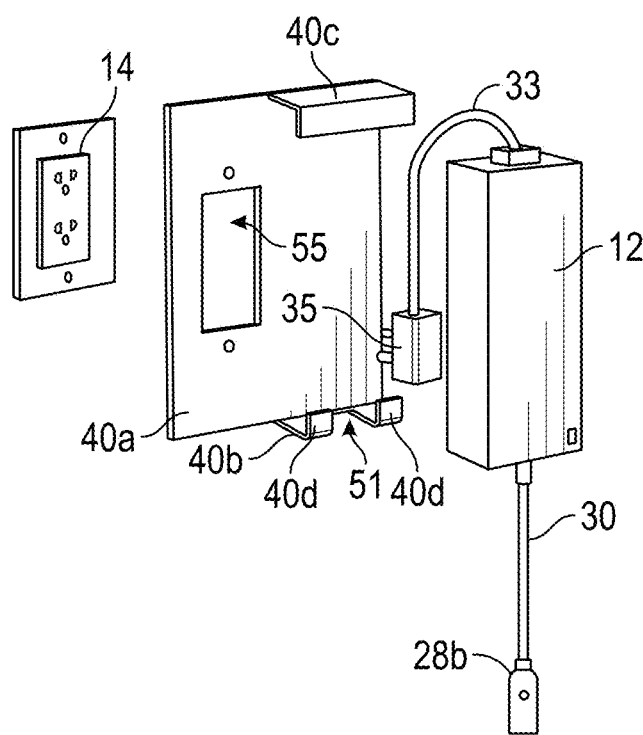
Figure 4F:
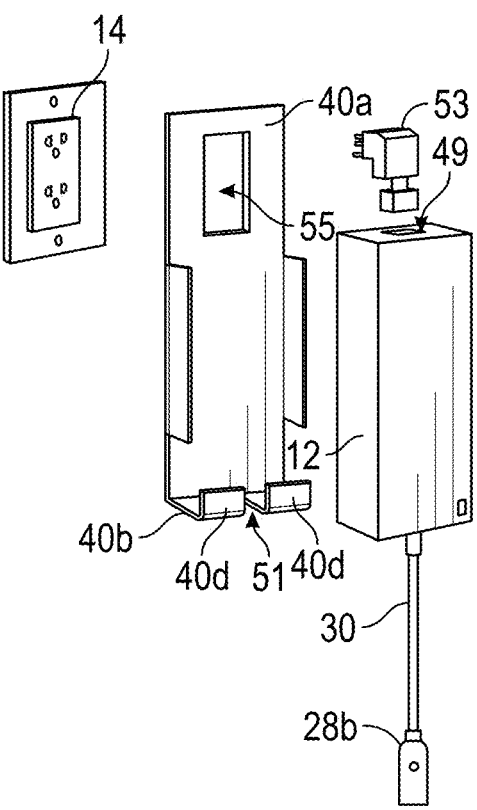
Figure 4G:
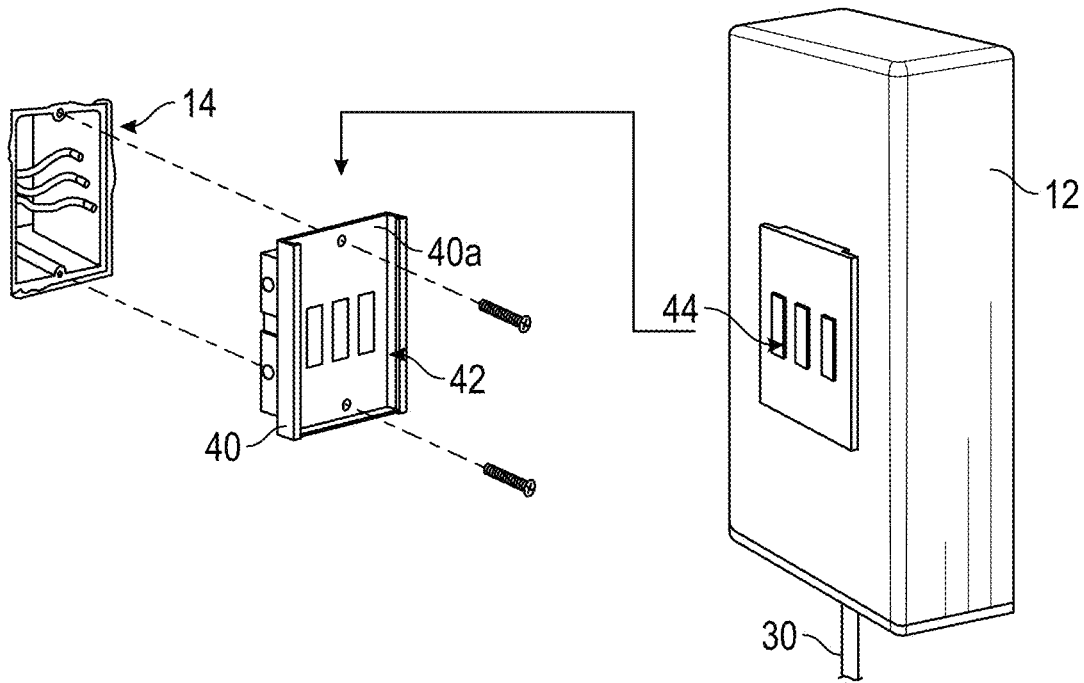

The brackets 40 of FIGS. 4E and 4F combine features of the brackets 40 shown in FIGS. 4B and 4E, including panel openings 55 that permit access to a wall outlet 14, lower support panels 40b defining notches 51 as wire passageways, and in the embodiment of FIG. 4E a top plate 40c engages an upper portion of the power supply module 12, while in the embodiment of FIG. 4F an angled connector piece 43 connects to the wall outlet 14. Optionally, and with reference to FIG. 4G, a holster-style bracket 40 optionally includes electrical contacts 42 along a vertical surface 40a, for engaging respective contacts 44 at the back of the power supply module 12, when the power supply module 12 is hung on the holster-style bracket 40.

Figure 5A:
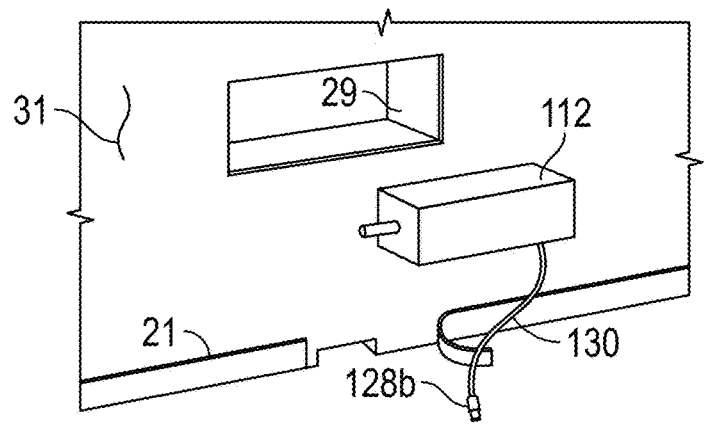
FIGS. 5A-5C is a series of three perspective views depicting installation steps of an in-wall power supply for a flat-conductor power distribution system like that of FIG. 1.
Figure 5B:
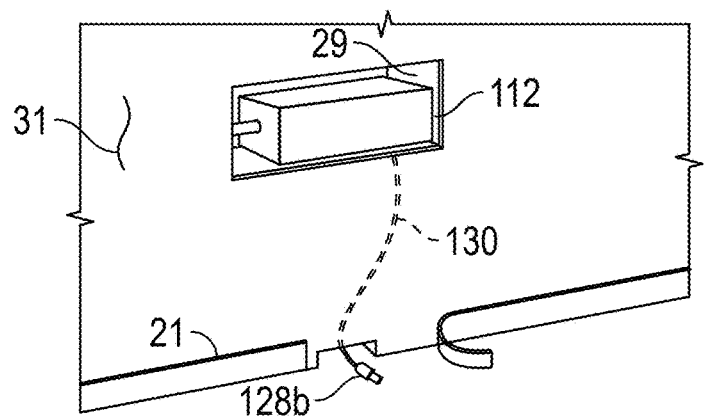
Figure 5C:
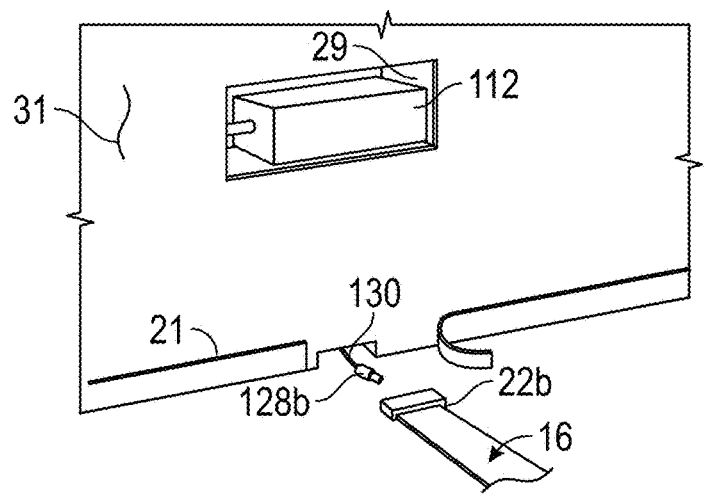
Figure 6:
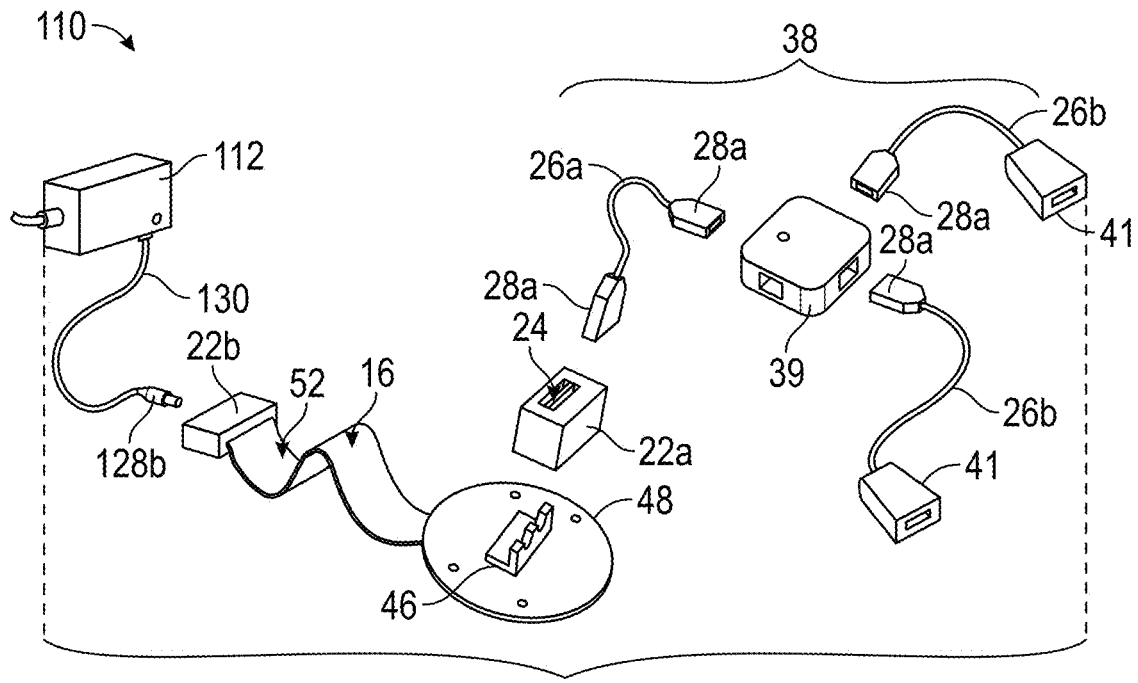
FIG. 6 is an exploded perspective view of another flat-conductor electrical power or data distribution system in accordance with the present invention.

Optionally, and as shown in FIGS. 5A-5C, an in-wall power supply 112 may be installed in a junction box 29 inside of a wall surface 31 to provide a more hidden or discrete appearance without any significant protrusions along the wall 31. FIGS. 5A-5C provide three perspective views depicting installation steps of an in-wall power supply 112 that has power outfeed conductors in a jacketed cord 130, terminating in a DC power plug 128b that engages a compatible power input receptacle block or flat-wire adapter 22b at the flat conductor strip 16. In-wall power supply 112 is either hard-wired into a circuit of an electrical mains system as shown in FIGS. 5A-5C, or may be coupled to the electrical mains via a modular electrical system.

Figure 7A:
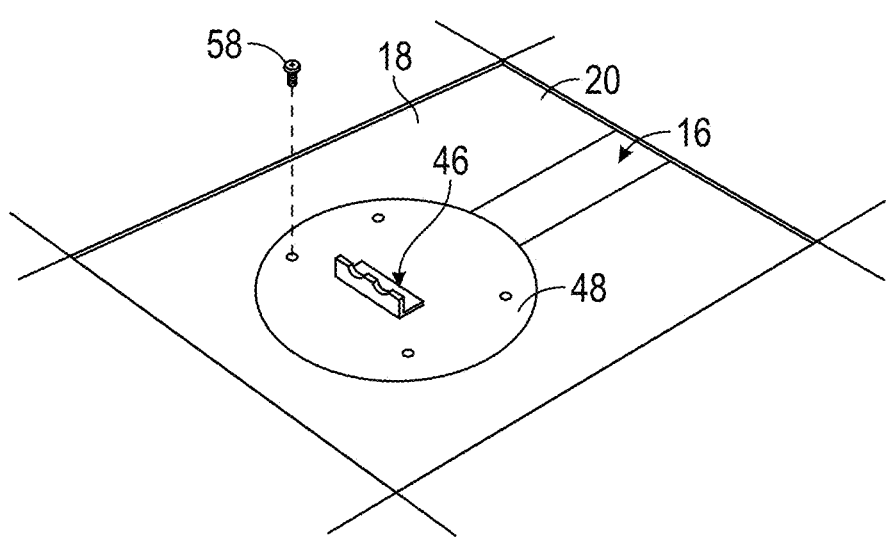
FIGS. 7A-7C is a series of three perspective views depicting installation steps of a two-port floor-mounted electrical power outlet of the flat-conductor electrical power or data distribution system of FIG. 6.
Figure 7B:
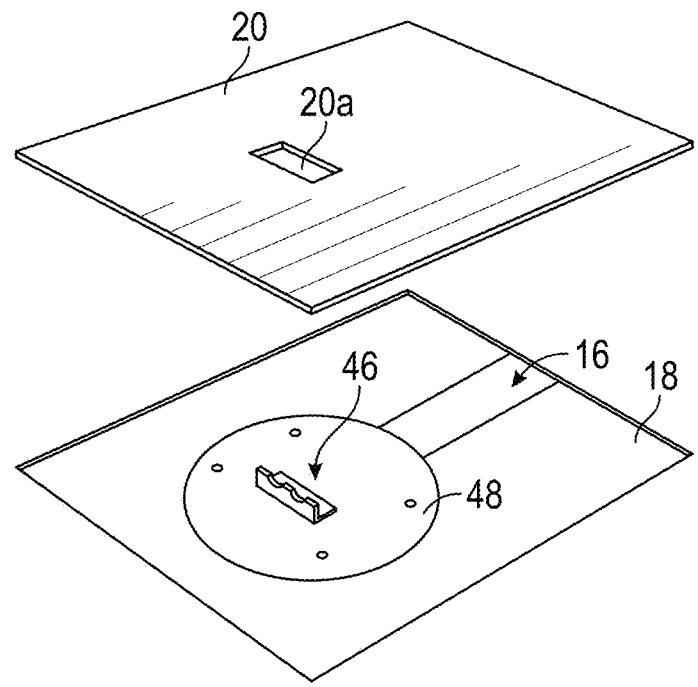
Figure 7C:
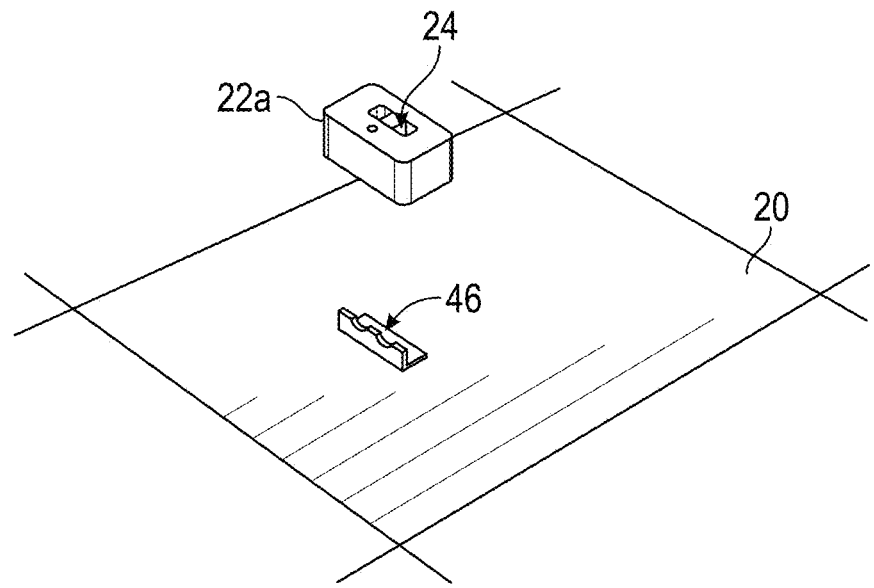
Figure 8A:
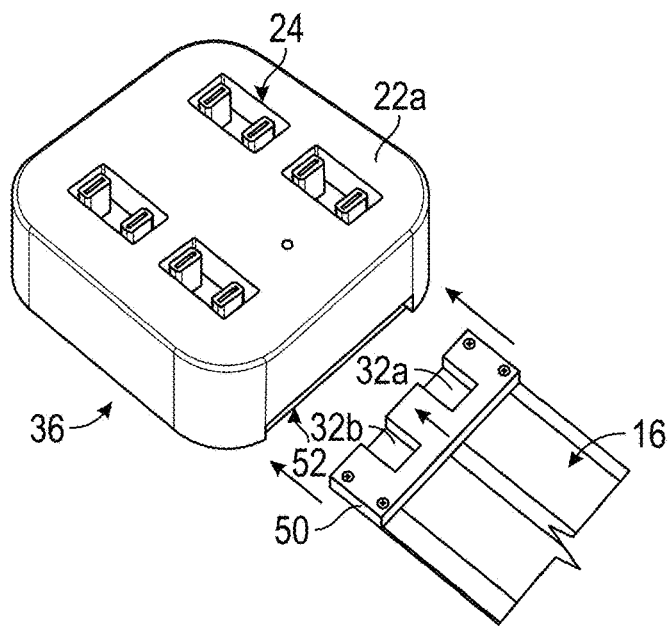
FIG. 8A is a perspective view of a four-port electrical power outlet and a flat conductor with connector, shown prior to insertion of the connector into a power-receiving receptacle of the four-port electrical power outlet.
Figure 8B:
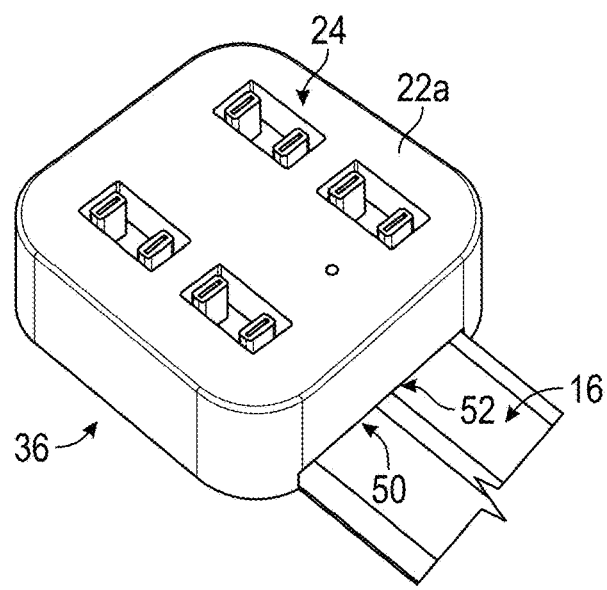
FIG. 8B is another perspective view of the four-port electrical power outlet and a flat conductor with connector of FIG. 8A, shown after insertion of the connector into the receptacle.
Figure 8C:
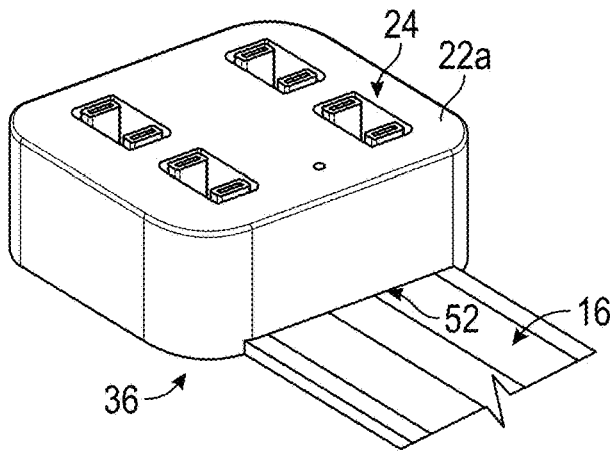
FIG. 8C is another perspective view of the four-port electrical power outlet and a flat conductor with connector that that of FIGS. 8A and 8B, shown with an illuminated indicator light.

FIG. 6 provides an overview of a similar electrical power or electronic data distribution system 110, shown with an additional power distribution system 38 that may be associated with a furniture article as will be described below. FIGS. 7A-7C provide three perspective views depicting installation steps of a two-port floor-mounted electrical power outlet block 22a (FIGS. 6 and 7C) of the flat-conductor electrical power or data distribution system 110. An L-shaped power connector 46 is mounted to a disc-shaped support base 48 into which flat-conductor strip 16 is routed (FIGS. 6 and 7A). Support base 48 and conductor strip 16 are positioned under a carpet or flooring tile 20 (FIGS. 7B and 7C), which is omitted in FIG. 7A to show the underlying structures. A rectangular opening 20a is cut into tile 20, as shown in FIG. 7B, and the tile 20 is laid atop support base 48 and the underlying subfloor 18 with connector 46 projecting upwardly through the carpet tile 20. Support base 48 may be secured to the underlying surface via mechanical fasteners 58 or adhesives, or may be held in place by the carpet tile 20 and the connector 46 projecting through the opening 20a. In the illustrated embodiment of FIGS. 11A and 11B, support base 48 is a rectangular sheet metal piece. With carpet tile 20 installed, the power outlet block 22a is pressed down onto the connector 46 and snap-fit or otherwise secured in place, as shown in FIG. 7C. The installation of power outlet block 22a causes electrical contacts at the bottom of the power outlet block 22a to electrically engage with corresponding contacts along an upper surface of the connector 46, as will be described below.

It will be appreciated that many other styles or types of electrical-mechanical connection may be used to establish a connection from flat-conductor strip 16 to a power outlet block 22a. For example, and with reference to FIGS. 8A-8C, a straight connector 50 is mounted at the end of flat-conductor strip 16, which is inserted into a receptacle opening or recess 52 at a lower region or surface 36 of a four-port power outlet block 22*a*. Straight connector 50 and exposed ends of the planar electrical conductors 32*a*, 32*b* may be frictionally engaged in the receptacle opening or recess 52 and, optionally, may be secured with mechanical fasteners such as threaded screws.

Figure 9B:
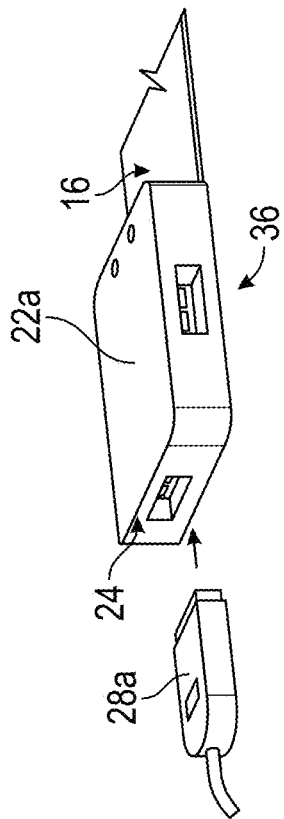
FIGS. 9A-9K are perspective views of various different electrical power outlet configurations for use with the flat-conductor electrical power or data distribution system.
Figure 9D:
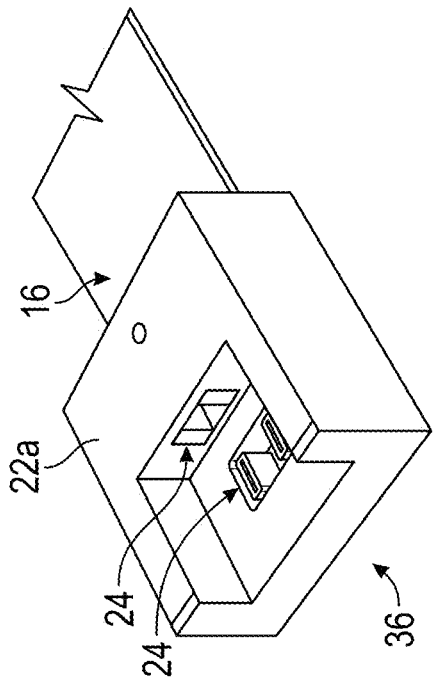
Figure 9A:
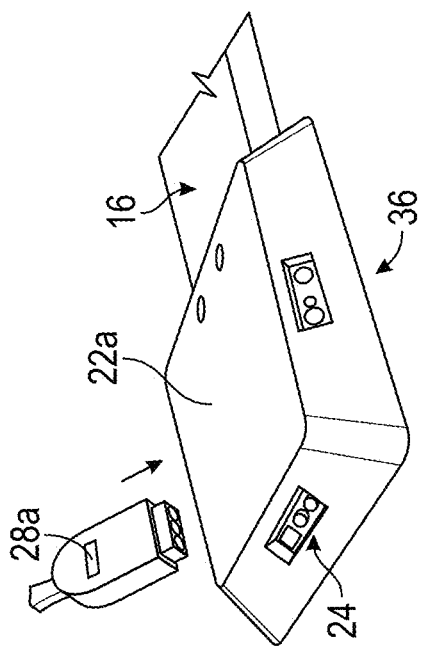
Figure 9C:
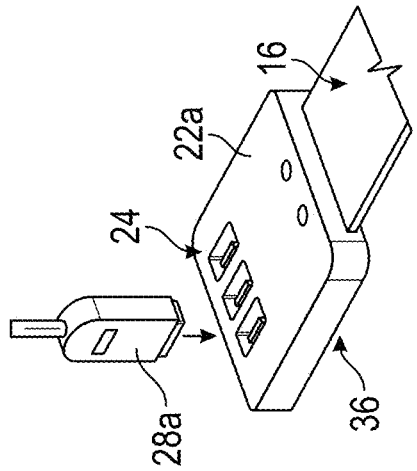
Figure 9E:
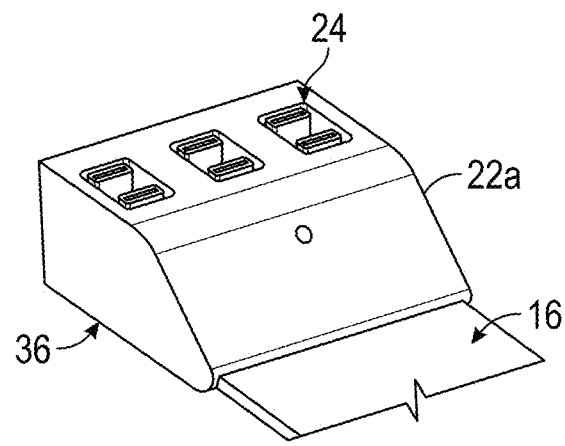
Figure 9F:
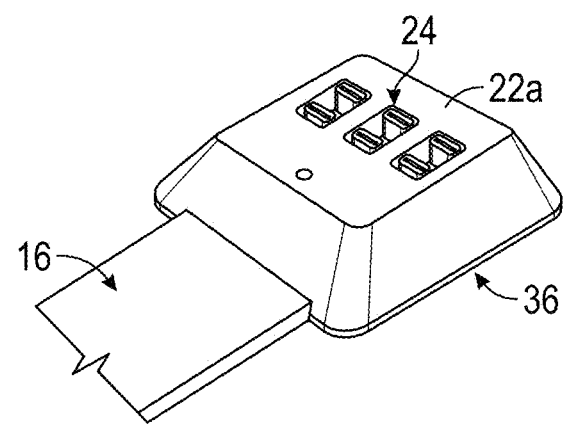
Figure 9G:
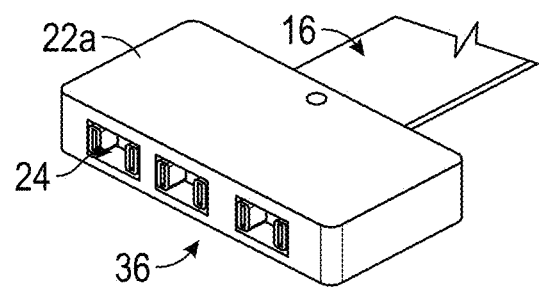
Figure 9I:
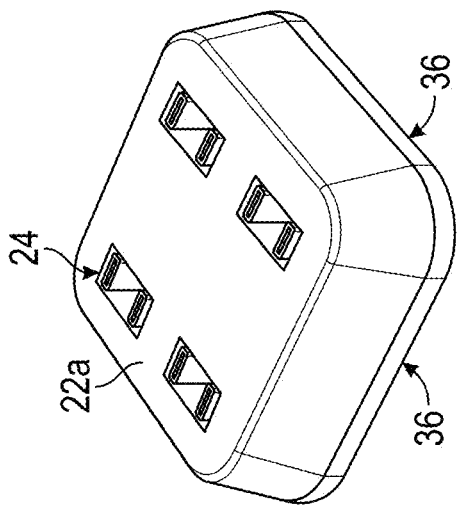
Figure 9K:
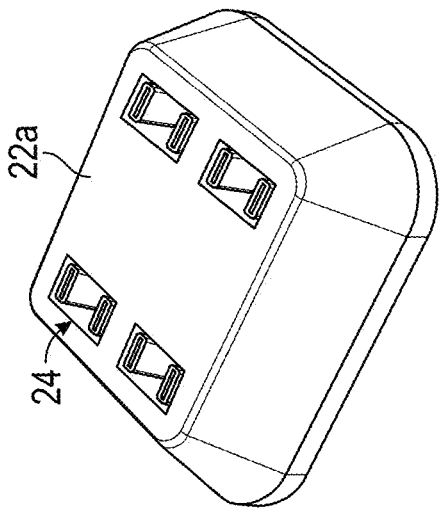
Figure 9H:
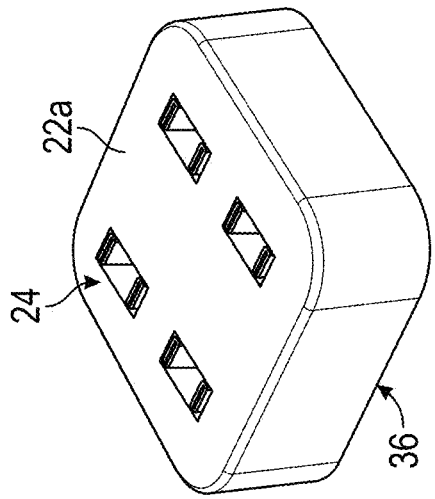
Figure 9J:
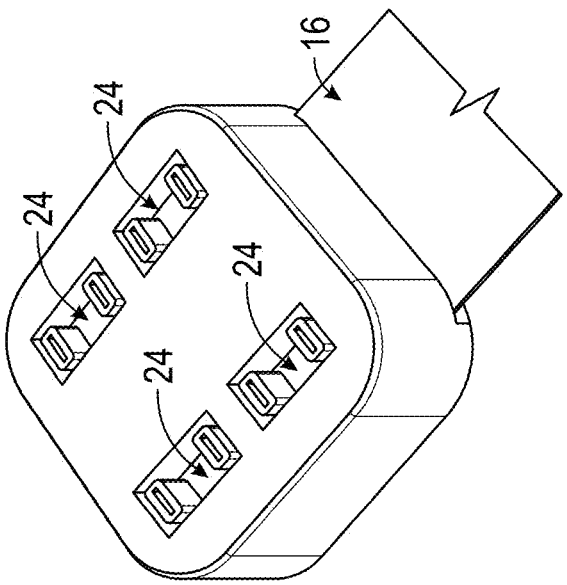

FIGS. 9A-9K depict various different electrical power outlet configurations with power outlet blocks 22*a* having multiple power outlet receptacles 24 in different locations. Outlet receptacles 24 are typically positioned in elevated locations for spill resistance. Power outlet blocks 22*a* may be structurally reinforced and/or have one or more sloped sides to reduce trip hazards and to reduce the risk of damage from heavy rolling objects. In the exemplary embodiments, power outlet blocks 22*a* may have a truncated pyramid shape with an outlet receptacle 24 at each of four sloped sides (FIG. 9A), a square or rectangular block shape with an outlet receptacle 24 at each of four vertical sides (FIG. 9B) or along just one vertical side (FIG. 9G), a square or rectangular block shape with outlet receptacles 24 along a top surface (FIGS. 9C, 9H, and 9J), and a square or rectangular block shape with a notch or recess region having outlet receptacles 24 facing in different directions (FIG. 9D). In the example of FIG. 9D, it can be seen that use of the upwardly-facing outlet 24 would likely preclude use of the laterally outwardly-facing outlet 24 and vice versa, although it is envisioned the angled connectors, if appropriately sized and shaped, could be used simultaneously in both outlets 24. Other shape configurations of outlet receptacles include wedge-shaped with outlet receptacles 24 along a top surface (FIG. 9E), and a truncated pyramid shape with outlet receptacles 24 along a top surface (FIGS. 9F, 9I, and 9K).

Figure 10A:
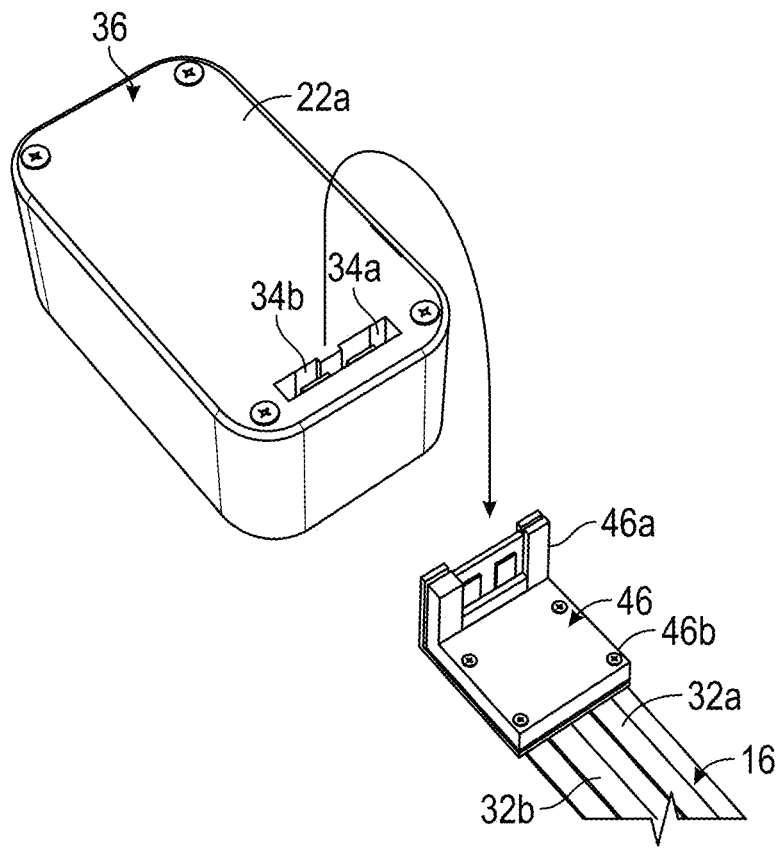
FIG. 10A is a perspective view of an inverted two-power electrical power outlet and a flat conductor with L-shaped connector, shown prior to connection and depicting a connecting motion path.
Figure 10B:
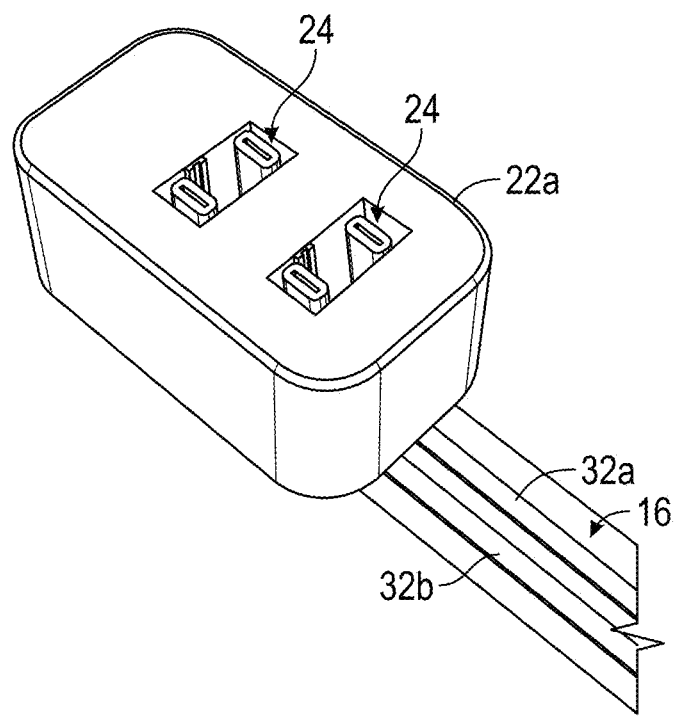
FIG. 10B is another perspective view of the two-power electrical power outlet and flat conductor of FIG. 10A, shown after connection with the power outlet in an upright orientation.

Additional electrical-mechanical connections are envisioned, such as shown in FIGS. 10A-11B, in which two-port power outlet blocks 22*a* are connected in a similar manner as described above with reference to FIGS. 7A-7C. As shown in FIG. 10A, a lower region of a two-port power outlet block 22*a* includes a pair of female frictional contacts 34*a*, 34*b* that receive and engage corresponding exposed ends of the planar electrical conductors 32*a*, 32*b* of the conductor strip 16. Optionally, female frictional contacts 34*a*, 34*b* are configured to cut through or displace the insulative film or sheet material or substrate 17 of the conductor strip 16 to establish an electrical connection with the respective electrical conductors 32*a*, 32*b*. In the embodiment of FIGS. 10A and 10B (and optionally in the embodiments of FIGS. 6-7C, 11A and 11B), the end portions of the planar electrical conductors 32*a*, 32*b*, are held in a vertical orientation in an L-shaped power connector 46 having an upright leg 46*a* and a base leg 46*b*, with at least portions of the conductor strip 16 passing through and secured by the legs 46*a*, 46*b* of the connector 46. Power connector 46 is sized and shaped to pass through a correspondingly-shaped opening 20*a* in a carpet tile or other floor finish, a wall trim strip or baseboard, or the like. Base leg 46*b* clamps around the conductor strip 16 using mechanical fasteners, and is configured to lie along a floor or wall surface, while the outwardly or upwardly-extending leg 46*a* projects through the opening in the floor or wall finishing surface for engagement by the power outlet block 22*a*.

Figure 11A:
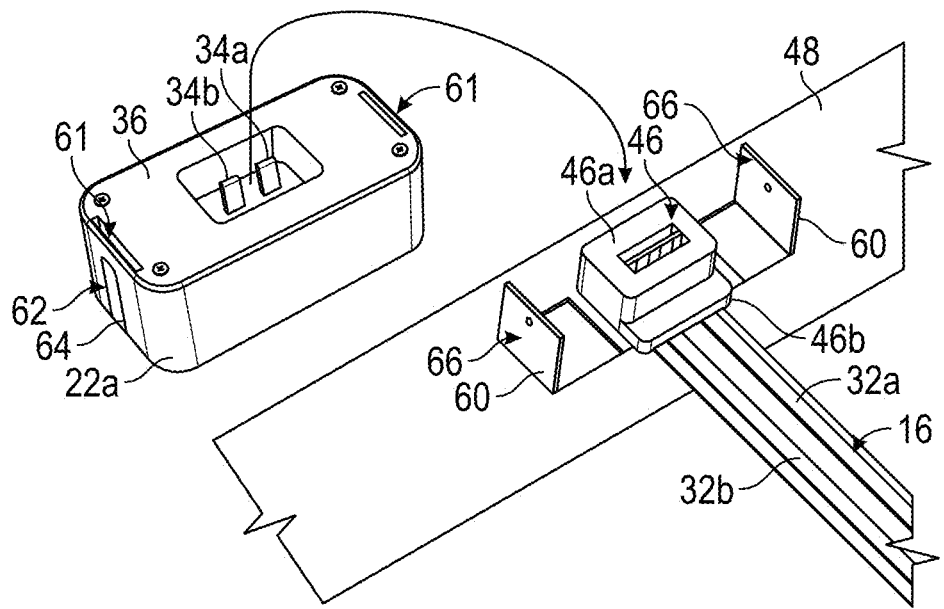
FIG. 11A is a perspective view of another inverted two-power electrical power outlet and another flat conductor with L-shaped connector, shown prior to connection and depicting a connecting motion path.
Figure 11B:
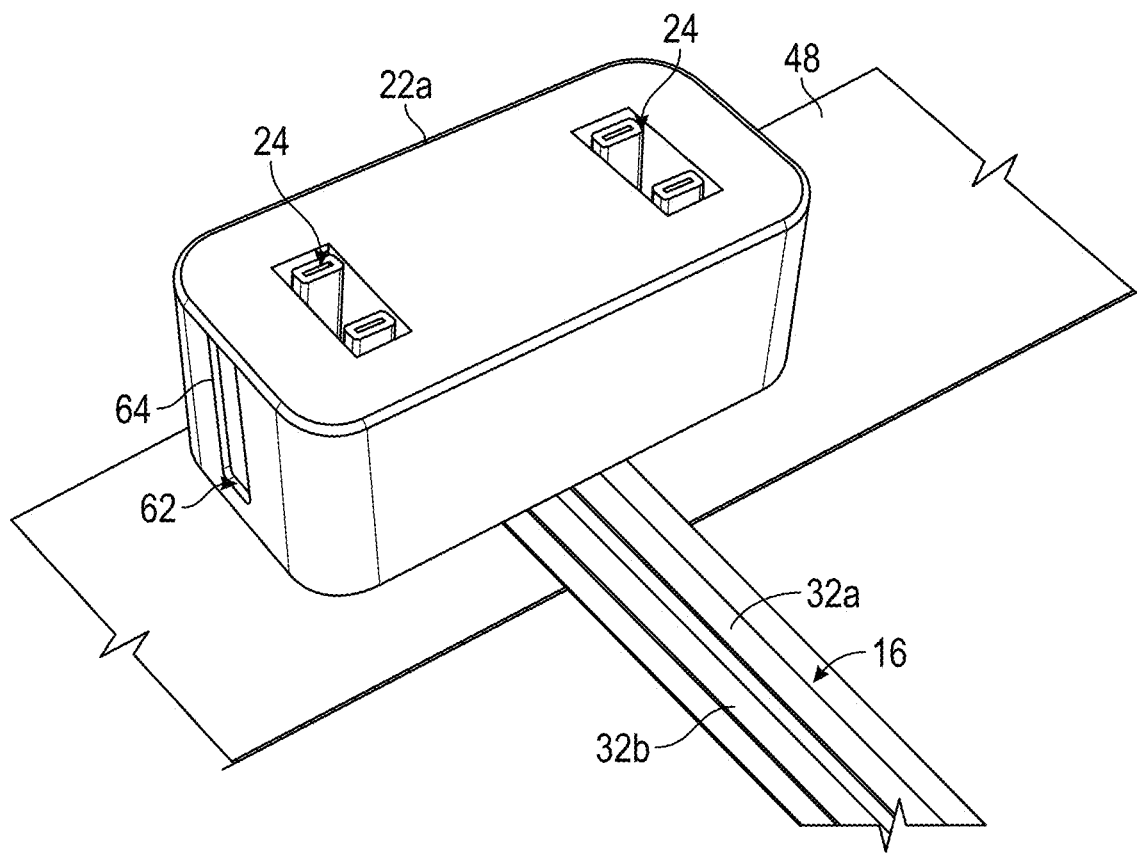
FIG. 11B is another perspective view of the two-power electrical power outlet and flat conductor of FIG. 11A, shown after connection with the power outlet in an upright orientation.

A similar arrangement is illustrated in FIGS. 11A and 11B, in which the support base 48 includes a pair of upright mounting tabs 60 in spaced arrangement on either side of the L-shaped power connector 46 that is mounted to the sheet metal support base 48. Mounting tabs 60 are sized and positioned to fit into corresponding slots 61 formed in a bottom surface of the power outlet block 22*a*. Mechanical fasteners such as threaded screws (not shown) may then be inserted through respective openings 62 formed in opposite end walls 64 of the power outlet block 22*a*, and secured to corresponding openings 66 formed in the mounting tabs 60, to thereby secure and prevent unintentional removal or displacement of the power outlet block 22*a* relative to the L-shaped power connector 46.

Referring to FIG. 12, a single-port electrical power outlet block 22*a* electrically engages flat conductor strip 16 with three non-piercing contacts 34*a*, 34*b*, 34*c* that engage respective generally planar electrical conductors 32*a*, 32*b*, 32*c* of the conductor strip 16. A base or support plate 54 supports conductor strip 16 and has clips or tabs 54*a* for securing or maintaining the conductor strip 16 in position relative to the power outlet block 22*a*. Optionally, and as shown in FIG. 14A, screws 58 or other mechanical fasteners may be used to ensure a tight and secure mechanical connection of the support plate 54 to the bottom surface 36 of the power outlet block 22*a*, with a secure electrical connection of the contacts 34*a*, 34*b* to the corresponding planar electrical conductors 32*a*, 32*b* of the conductor strip 16 (not shown in FIG. 14A). Screws 58 may pass through the insulative film or sheet material of the conductor strip 16 while also applying pressure to the support plate 54, and thereby applying pressure to the planar electrical conductors 32*a*, 32*b* against the contacts 34*a*, 34*b*, which may be spring contacts to help ensure that suitable electrical contact is maintained.

In FIGS. 13-13B there is shown another power outlet block 22*a* and input block 22*b* that are identical except for the configuration of their respective electrical receptacle 24. Each outlet block 22*a* or input block includes an upper region that is pressed down onto a contact support piece 72 to establish an electrical connection to the planar electrical conductors of a conductor strip (not shown), which is sandwiched and secured between an upper portion of a support plate 54 and a lower portion of the contact support piece 72.

Figure 14C:
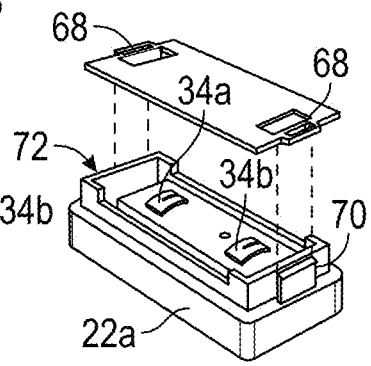
Figure 14D:
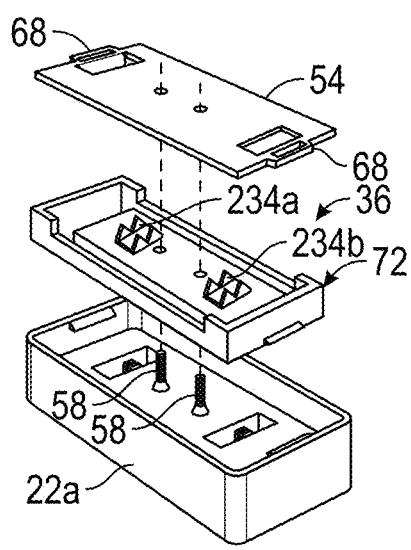
FIGS. 14D and 14E are partially exploded perspective views of two receptacle blocks with piercing contacts, shown in an inverted orientation, and similar to the receptacle blocks of FIGS. 12 and 14A-14C.
Figure 14E:
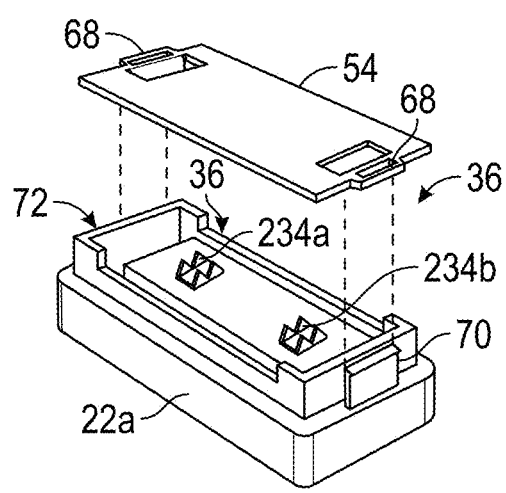
Figure 15:
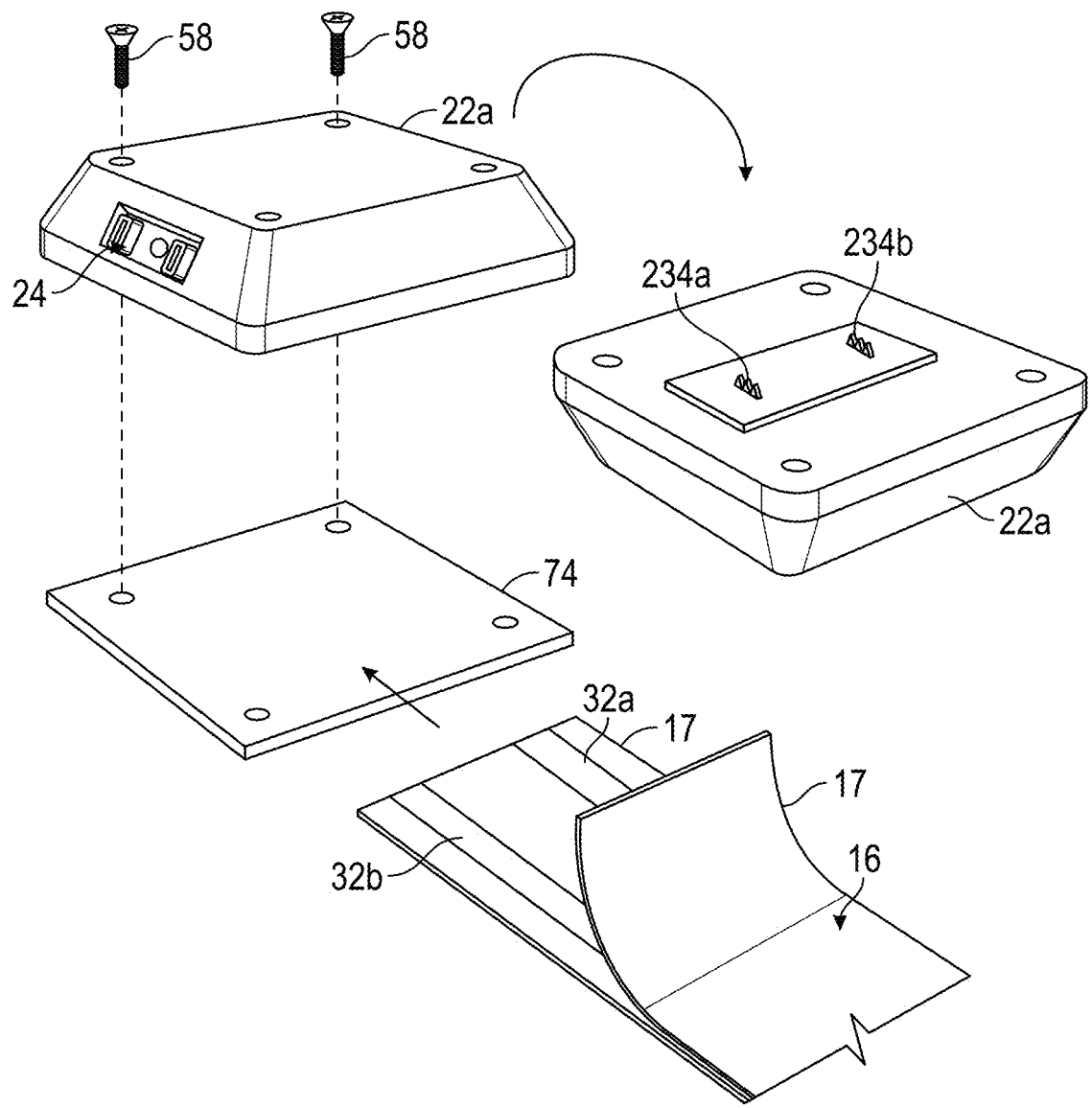
FIG. 15 is a partially exploded perspective view of another electrical power outlet and flat conductor, and includes an additional perspective view of the receptacle block in an inverted orientation to show its piercing electrical contacts.

Optionally, and as shown in FIG. 14C, the support plate 54 may include catch tabs 68 that are engaged by respective resilient latch tabs 70 projecting from opposite ends of the power outlet block 22*a*, so that the support plate 54 can be at least initially secured to the power outlet block 22*a*. In a similar arrangement shown in FIG. 14B, the support plate 54 includes catch tabs 70 for securing to the power outlet block 22*a*, while a pair of screws 58 are provided for securing and clamping the support plate 54 to a contact support piece 72 with the conductor strip 16 (not shown) clamped in between. After the support plate 54 and conductor strip 16 are clamped to the contact support piece 72 with screws 58, the upper portion of the power outlet block 22*a* may be snap-fit onto the exposed portions of the contact support piece 72. In FIG. 14B there are shown two electrical contacts 134*a*, 134*b* at an underside of the upper portion of the power outlet block 22*a*, for engaging respective upper contacts (not shown) corresponding to each of the spring contacts 34*a*, 34*b*.

It may be desirable to provide only resilient latch tabs 70 or other break-away mechanical fasteners securing the upper portion of a given power outlet block 22*a* to its corresponding support plate 54, so that side loads applied to the exposed upper region of the power outlet block 22*a* will cause the upper region to detach and therefore present less of a trip hazard or obstruction. Optionally, the "breakaway" mechanical connection between the upper region of the power outlet block 22*a* and its corresponding support plate 54 merely releases the mechanical engagement without any breakage, such that the upper region of the power outlet block 22a can be readily re-secured to the support plate 54 with the electrical connection also re-established after such an event, preferably without tools and without need for replacing any components. Although it is understood that portions of energized planar electrical conductors 34a, 34b may be exposed upon inadvertent removal of the upper region of the power outlet block 22a, such exposure will generally not present a safety hazard provided that sufficiently low DC current is present electrical conductors 34a, 34b.

It will be appreciated that piercing contacts 234a, 234b (FIGS. 14D and 14E) may be substituted for the spring contacts of FIGS. 12 and 14A-14C. The piercing contacts 234a, 234b will pierce the planar electrical conductors 32a, 32b once the support plate 54 is secured to the lower region of the upper portion of the power outlet block 22a. The piercing engagement of the piercing contacts 234a, 234b with the planar electrical conductors 32a, 32b may provide additional resistance to movement of the conductors 32a, 32b relative to the power outlet block 22a, as compared to the friction-only engagement by the spring contacts of FIGS. 12 and 14A-14C. The use of piercing contacts 234a, 234b may also have the benefit of substantially avoiding the exposure of planar electrical conductors 34a, 34b upon accidental or inadvertent removal of the upper portion of the outlet block 22a from the support plate 54.

Piercing contacts 234a, 234b also eliminate the need to remove a portion of the insulative film or sheet material of the conductor strip 16 to expose the planar conductors 32a, 32b, because the piercing contacts 234a, 234b are capable of piercing the insulative film or sheet material 17 of conductor strip 16. This can simplify the installation and setup process, such as shown in FIG. 15, in which the procedure for mechanically securing and electrically engaging the power outlet block to the conductor strip 16 can be limited to simply securing a base or support plate 74 of the power outlet block 22a with fasteners 58 with the conductor strip 16 sandwiched in between a lower surface of the power outlet block 22a and the base or support plate 74.

Optionally, conductor strip 16 may continue out the other side of the power outlet bock 22a and supply power to downstream receptacle blocks (not shown). It will also be appreciated that, with sufficient size (gauge) of planar electrical conductors 32a, 32b, 32c and sufficient protection provided by the insulative film or sheet material of the conductor strip 16, high voltage AC power service can be provided at power outlet blocks by coupling the conductors 32a, 32b, 32c to line, neutral, and ground conductors of an electrical mains source.

Therefore, the electrical power or electronic data distribution system of the present invention facilitates the routing of at least low voltage DC power and/or electronic data signals underneath aesthetic surfaces such as carpeting, tile, trim pieces, and the like, so that access to the power and/or data may be provided substantially anywhere desired within a work or living area. This may be accomplished without disturbing the underlying surfaces, such as subflooring or wall paneling. The distribution system can be modular and, in some embodiments, set up substantially without the use of tools.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power or electronic data distribution system comprising:
   a supply module adapted to receive electrical power or electronic data from a source, said supply module comprising at least two outfeed conductors;
   a conductor strip comprising at least two planar electrical conductors lying in a coplanar and side-by-side laterally spaced arrangement, and upper and lower layers of insulative sheet material disposed above and below said planar electrical conductors, respectively, said upper and lower layers of insulative sheet material joined together with said planar electrical conductors therebetween, wherein said planar electrical conductors are electrically coupled to respective ones of said outfeed conductors, and said conductor strip is configured for placement beneath an aesthetic surface;
   a receptacle block comprising a pair of contacts in side-by-side spaced arrangement along a lower region of said receptacle block and an electrical receptacle positioned above said lower region;
   a support plate configured to be coupled to said lower region of said receptacle block, wherein said conductor strip is received and secured between said support plate and said lower region of said receptacle block; and
   a contact support piece in which said pair of contacts are mounted, wherein said contact support piece is releasably mechanically and electrically coupled to said lower region of said receptacle block, and said contact support piece is directly and releasably mechanically coupled to said support plate;
   wherein said contacts are configured to electrically engage respective ones of said generally planar electrical conductors in a region where said upper layer of insulative sheet material is removed or pierced, and to convey electrical power or electronic data signals to respective receptacle contacts of said electrical receptacle.

2. The electrical power or electronic data distribution system of claim 1, wherein said contacts comprise piercing contacts configured to pierce said insulative sheet material and respective ones of said planar electrical conductors upon coupling of said support plate to said lower region of said receptacle block.

3. An electrical power or electronic data distribution system comprising:
   a supply module adapted to receive electrical power or electronic data from a source, said supply module comprising at least two outfeed conductors;
   a conductor strip comprising at least two planar electrical conductors lying in a coplanar and side-by-side laterally spaced arrangement, and upper and lower layers of insulative sheet material disposed above and below said planar electrical conductors, respectively, said upper and lower layers of insulative sheet material joined together with said planar electrical conductors therebetween, wherein said planar electrical conductors are electrically coupled to respective ones of said outfeed conductors, and said conductor strip is configured for placement beneath an aesthetic surface;
   a receptacle block comprising a pair of contacts in side-by-side spaced arrangement along a lower region of said receptacle block and an electrical receptacle positioned above said lower region; and a support plate configured to be coupled to said lower region of said receptacle block, wherein said conductor strip is received and secured between said support plate and said lower region of said receptacle block;

wherein said contacts comprise spring contacts or piercing contacts and are configured to electrically engage respective ones of said generally planar electrical conductors in a region where said upper layer of insulative sheet material is removed or pierced, and to convey electrical power or electronic data signals to respective receptacle contacts of said electrical receptacle.

4. The electrical power or electronic data distribution system of claim 3, wherein said support plate and said receptacle block are arranged along a midsection of said conductor strip with portions of said conductor strip extending in opposite directions away from said receptacle block.

5. The electrical power or electronic data distribution system of claim 1, further comprising a connector disposed along said conductor strip, wherein a portion of said insulative sheet material is removed at said connector to expose portions said planar electrical conductors for engagement by said contacts.

6. An electrical power or electronic data distribution system comprising:

a supply module adapted to receive electrical power or electronic data from a source, said supply module comprising at least two outfeed conductors;

a conductor strip comprising at least two planar electrical conductors lying in a coplanar and side-by-side laterally spaced arrangement, and upper and lower layers of insulative sheet material disposed above and below said planar electrical conductors, respectively, said upper and lower layers of insulative sheet material joined together with said planar electrical conductors therebetween, wherein said planar electrical conductors are electrically coupled to respective ones of said outfeed conductors, and said conductor strip is configured for placement beneath an aesthetic surface;

a receptacle block comprising a pair of contacts in side-by-side spaced arrangement along a lower region of said receptacle block and an electrical receptacle positioned above said lower region; and a connector disposed along said conductor strip, wherein a portion of said insulative sheet material is removed at said connector to expose portions said planar electrical conductors for engagement by said contacts;

wherein said contacts are configured to electrically engage respective ones of said generally planar electrical conductors in a region where said upper layer of insulative sheet material is removed or pierced, and to convey electrical power or electronic data signals to respective receptacle contacts of said electrical receptacle;

wherein said connector is insertable into said lower region of said receptacle block, and wherein said pair of contacts comprise frictional contacts configured to engage said exposed portions of said planar electrical conductors.

7. The electrical power or electronic data distribution system of claim 6, wherein said connector is L-shaped including a base leg and an outwardly-extending leg, wherein at least said outwardly-extending leg is configured to extend through an opening formed in the aesthetic surface, and wherein said exposed portions of said planar electrical conductors are positioned in said outwardly-extending leg.

8. The electrical power or electronic data distribution system of claim 7, further comprising a support base coupled to said base leg, wherein said support base is configured for placement beneath the aesthetic surface and for securement to a surface underlying the aesthetic surface.

9. The electrical power or electronic data distribution system of claim 7, wherein at least said base leg of said L-shaped connector is configured to clamp to said conductor strip.

10. The electrical power or electronic data distribution system of claim 1, wherein said supply module comprises an AC-to-DC electrical power converter.

11. The electrical power or electronic data distribution system of claim 10, further comprising a wall-mounting bracket configured to support said supply module.

12. The electrical power or electronic data distribution system of claim 11, wherein said wall-mounting bracket defines an opening for providing access to a wall-mounted power outlet.

13. The electrical power or electronic data distribution system of claim 1, further comprising a table or desk power distribution system, said table or desk power distribution system comprising a first jumper wire coupled to said receptacle block, a junction box coupled to said first jumper wire, a second jumper wire coupled to said junction box, and a desk or table mountable power outlet coupled to said second jumper wire.

14. An electrical power or electronic data distribution system comprising:

a supply module adapted to receive electrical power or electronic data from a source, said supply module comprising at least two outfeed conductors;

a conductor strip comprising at least two planar electrical conductors in spaced arrangement and an insulative sheet material disposed around said planar electrical conductors, wherein said planar electrical conductors are electrically coupled to respective ones of said outfeed conductors, and said conductor strip is configured for placement beneath an aesthetic surface;

a receptacle block comprising a pair of contacts along a lower region of said receptacle block and an electrical receptacle positioned above said lower region; and a connector disposed along said conductor strip, wherein a portion of said insulative sheet material is removed at said connector to expose portions said planar electrical conductors for engagement by said contacts;

wherein said contacts are configured to electrically engage respective ones of said generally planar electrical conductors and to convey electrical power or electronic data signals to respective receptacle contacts of said electrical receptacle;

wherein said connector is insertable into said lower region of said receptacle block, and wherein said pair of contacts comprise frictional contacts configured to engage said exposed portions of said planar electrical conductors; and wherein said connector is L-shaped including a base leg and an outwardly-extending leg, wherein at least said outwardly-extending leg is configured to extend through an opening formed in the aesthetic surface, and wherein said exposed portions of said planar electrical conductors are positioned in said outwardly-extending leg.

15. The electrical power or electronic data distribution system of claim 14, further comprising a support base coupled to said base leg, wherein said support base is configured for placement beneath the aesthetic surface and for securement to a surface underlying the aesthetic surface.

16. The electrical power or electronic data distribution system of claim 14, wherein at least said base leg of said L-shaped connector is configured to clamp to said conductor strip.

* * * * *